(12) United States Patent
Tsonev et al.

(10) Patent No.: US 11,483,071 B2
(45) Date of Patent: Oct. 25, 2022

(54) OPTICAL WIRELESS COMMUNICATION DEVICE

(71) Applicant: PURELIFI LIMITED, Edinburgh (GB)

(72) Inventors: Dobroslav Tsonev, Edinburgh (GB); Mostafa Afgani, Edinburgh (GB)

(73) Assignee: PURELIFI LIMITED, Edinburgh (GB)

(*) Notice: Subject to any disclaimer, the term of this patent is extended or adjusted under 35 U.S.C. 154(b) by 269 days.

(21) Appl. No.: 16/639,057

(22) PCT Filed: Aug. 1, 2018

(86) PCT No.: PCT/GB2018/052200
§ 371 (c)(1),
(2) Date: Feb. 13, 2020

(87) PCT Pub. No.: WO2019/034838
PCT Pub. Date: Feb. 21, 2019

(65) Prior Publication Data
US 2020/0366372 A1   Nov. 19, 2020

(30) Foreign Application Priority Data
Aug. 15, 2017 (GB) ...................................... 1713092

(51) Int. Cl.
*H04B 10/00* (2013.01)
*H04B 10/114* (2013.01)
*H04B 10/116* (2013.01)

(52) U.S. Cl.
CPC ....... *H04B 10/1141* (2013.01); *H04B 10/116* (2013.01); *H04B 10/1149* (2013.01); *H04B 2210/08* (2013.01)

(58) Field of Classification Search
CPC . H04B 10/116; H04B 10/112; H04B 10/1123; H04B 10/114; H04B 10/1141;
(Continued)

(56) References Cited

U.S. PATENT DOCUMENTS 5,812,371 A     9/1998 Chen et al.
2007/0147843 A1*  6/2007 Fujiwara ............ H04B 10/1143
                                                398/118

(Continued)

FOREIGN PATENT DOCUMENTS

WO    2014136110    9/2014
WO    2014180433    11/2014
WO    2016040028    3/2016

OTHER PUBLICATIONS

IB; International Preliminary Report on Patentability dated Feb. 27, 2020 in Application No. PCT/GB2018/052200.
(Continued)

*Primary Examiner* — Hanh Phan
(74) *Attorney, Agent, or Firm* — Snell & Wilmer L.L.P.

(57) ABSTRACT

An optical wireless communication device for transmitting data comprises a transmitter comprising a light source, a controller configured to control operation of the light source to produce modulated light comprising an optical wireless communication signal representative of said data, at least one proximity determining component configured to determine a proximity of an object, and a processing resource configured to determine whether the determined proximity is within a threshold distance, wherein the controller is configured to control operation of the transmitter and/or of at least one other component of the optical wireless communication device in dependence on whether the determined proximity is within the threshold distance.

26 Claims, 5 Drawing Sheets

(58) Field of Classification Search
CPC ............ H04B 10/1143; H04B 10/1149; H04B 10/40; G01S 7/4817; G01S 17/42
USPC ....... 398/118, 119, 124, 126, 127, 128, 129, 398/130, 131, 135, 136, 158, 159, 164, 398/172, 169, 170; 250/216, 330
See application file for complete search history.

(56) References Cited

U.S. PATENT DOCUMENTS

| | | | |
|---|---|---|---|
| 2008/0219672 A1* | 9/2008 | Tam | H03K 17/9631 455/556.1 |
| 2009/0128783 A1 | 5/2009 | Shih et al. | |
| 2009/0257376 A1 | 10/2009 | Dhanapal et al. | |
| 2013/0278151 A1 | 10/2013 | Lear | |
| 2014/0143034 A1 | 5/2014 | Pi | |
| 2014/0231633 A1* | 8/2014 | Parodi-Keravec | G01V 8/12 250/216 |

OTHER PUBLICATIONS

IPO; International Search Report and Written Opinion dated Oct. 16, 2018 in Application No. PCT/GB2018/052200.
E. Buckley, "On proximity detection systems for pico-projectors", Journal of the Society for Information Display, Jun. 2012, pp. 297-299, vol. 20, Issue 6.

* cited by examiner

OPTICAL WIRELESS COMMUNICATION DEVICE

CROSS-REFERENCE TO RELATED APPLICATIONS

This application is a national stage application of PCT/GB2018/052200, filed on Aug. 1, 2018, which claims priority to GB Application No. 1713092.3, filed on Aug. 15, 2017, which are hereby incorporated by reference in their entirety for all purposes.

FIELD OF THE INVENTION

The present invention relates to eye safety techniques for optical wireless communication devices.

BACKGROUND

Eye-safety constraints may impose restrictions on the power per solid angle of the light that light emitting devices radiate. Higher communication rates in optical wireless communications require more optical radiation to reach the optical detector, which translate into higher energy levels being emitted on the transmitter side for the same area coverage. At the same time, integration of communication interfaces into smaller devices leads to the requirement for smaller detectors, which further increases the required optical energy per unit of coverage area as the light collection area of the detector is reduced.

Eye-safety constraints may be defined in terms of overall light intensity that enters the human eye and, hence, in terms of the power per unit area (also referred to as irradiance) of the light at the human pupil. Hence, for any device that emits dispersed light, there is a minimum distance at which the light source is eye-safe, which is the distance at which the light intensity is within the allowed limits.

FIG. 1(a) presents an example where the power per unit area of the light reaching the human eye is too high. In this example, a transmitter 20 of the device emits optical signals 22, for example comprising infrared light. In this example, the intensity of light that enters the human eye 24 (e.g. the power per unit area at the human pupil) is too high and thus the device is not eye-safe at close proximity.

In an alternative configuration, as shown in FIG. 1(b), the same light is dispersed with a different design of transmitter optics 26, such that the light exiting the device is sufficiently dispersed to be eye-safe at close proximity. FIG. 1(b) shows a similar arrangement as in FIG. 1(a) with a transmitter 20 emitting optical signals 22, for example comprising infrared light, which reach a human eye 24. However, in this case the transmissive optics 26 disperse the light and reduce its intensity such that eye-safety constraints may be met. However, the use of dispersive optics can reduce the range and/or maximum data rate of optical wireless communications.

SUMMARY

In a first aspect, there is provided an optical wireless communication device for transmitting data comprising: a transmitter comprising a light source; a controller configured to control operation of the light source to produce modulated light comprising an optical wireless communication signal representative of said data; at least one proximity determining component configured to determine a proximity of an object; and a processing resource configured to determine whether the determined proximity is within a threshold distance, wherein the controller is configured to control operation of the transmitter and/or of at least one other component of the optical wireless communication device in dependence on whether the determined proximity is within the threshold distance.

The controlling of operation of the transmitter may comprise reducing an intensity of the light in response to the determined proximity being within the threshold distance.

The processing resource and controller may be provided as separate components or as a single component. The processing resource may form part of the controller or vice versa.

The controlling of operation of the transmitter may comprise, in response to the determined proximity being within the threshold distance, at least one of halting generation by the light source of the light, or at least partially blocking or redirecting the light.

The device may comprise at least one further transmitter. The controller may be configured to transmit said data by producing modulated light comprising the optical wireless communication signal representative of said data using one or both of the transmitter and the at least one further transmitter. The controller may be configured to selectively control operation of the at least one further transmitter in dependence on whether the determined proximity of the object is within the threshold distance.

The optical wireless communication signal, or at least part of the optical wireless communication signal, may be transmitted simultaneously or successively by the transmitter and the further transmitter. The data may be transmitted as a data stream during a transmission time. At least part of the data stream may be transmitted by the transmitter and a further at least part of the data stream may be transmitted by the further transmitter, for example in dependence on a proximity of one or more objects to the transmitter and/or the further transmitter during the transmission time.

The at least one proximity determining component may be configured to determine a proximity of an object from the transmitter and to determine a further proximity of an object from the further transmitter. The controller may be configured to control operation of the transmitter and the at least one further transmitter in dependence on whether the determined proximity is within the threshold distance and in dependence on whether the further proximity is within the or a threshold distance.

The further transmitter may comprise a further light source or the light may be selectively directed to one or other, or both of the transmitter and the further transmitter from the same light source. The transmitter and the further transmitter may each comprise a respective output, for example a respective output aperture and, optionally, the device may comprise a guide and/or switch arrangement for guiding light from the light source to a selected or other, or both of the transmitter and the further transmitter.

The controller may be configured to selectively control operation of the transmitter and the further transmitter such that the total power or irradiance from the transmitter and the further transmitter is maintained at a desired value or within a desired range, optionally subject to there being at least one of the transmitters for which determined object proximity is not within the threshold distance.

The controlling of operation of the at least one further component of the optical wireless communication device may comprise controlling said at least one further component such as to encourage a user to increase a distance between their eye or eyes and the wireless communication device.

The at least one further component may comprise a further light source, and the further light source is configured to emit visible light.

The processing resource may be configured to control the further light source and/or the light source of the transmitter to emit visible light having at least one property such as to provide discomfort and/or a warning signal for a user in response to the device being within the threshold distance of at least one of the user, the face of the user, an eye or eyes of the user.

The at least one property of the visible light may comprise intensity, colour, or colour and/or intensity variation as a function of time. The visible light may be flashing or pulsed light and the at least one property comprises a pulse or flash repetition frequency.

The at least one further component may comprise an alarm.

The alarm may be configured to output an alarm signal in response to the determined proximity being within the threshold distance.

The alarm signal may comprise at least one of an audible, visible, or tactile alarm signal.

The at least one proximity determining component may comprise a camera and the processing resource may be configured to perform an image recognition procedure on image data obtained from the camera in order to determine the proximity and/or at least one property of the object.

The image recognition procedure may comprise determining whether the object comprises a user, a user's face or eye based on the image data obtained from the camera.

The image recognition procedure may further comprise determining the proximity to the device of the user, the user's face or eye based on the size or scale of the user, the user's face or eye in the image data obtained from the camera.

The device may further comprise a camera, wherein the at least one proximity determining component and/or the processing resource may be configured to provide proximity information from the at least one proximity determining component both to the camera and for use by the processing resource in determining whether the determined proximity is within the user safety threshold distance The device may further comprise at least one sensor for receiving light reflected by the object and configured to provide a sensor signal representative of the received light, and the at least one proximity determining component may be configured to determine the proximity based on the sensor signal, wherein optionally the transmitter is arranged such that light reflected by the object comprises light from the transmitter.

The threshold distance may comprise a user safety threshold distance.

The threshold distance may be a distance at which power per solid angle of light emitted by the transmitter is at or below a predetermined threshold value.

The threshold distance may be in a range 1 cm to 20 cm, optionally in a range 1 cm to 36 cm, optionally in a range 1 cm to 5 cm, optionally less than 20 cm, optionally less than 36 cm, optionally less than 5 cm.

The controlling of the operation of the transmitter and/or of at least one other component of the optical wireless communication device may be in dependence on both the determined proximity being within the threshold distance and at least one further selected condition being satisfied.

The selected condition may comprise a length of time for which the object is at a particular distance or distances. The processing resource may be configured to determine a length of time for which the object is at any particular distance(s). The length of time that an object is at a particular distance from the transmitter, whilst the transmitter is operational, may be referred to as an exposure time at that distance.

The selected condition may comprise a value of a function representing total light energy received by the object from the transmitter. The processing resource may be configured to control operation of the transmitter and/or of at least one other component of the optical wireless communication device in dependence on a value of a function. The processing resource may calculate the value of the function. The function may comprise a function of exposure time and distance between the object and the transmitter and/or power per solid angle of the transmitter. The function may represent total light energy received by the object from the transmitter.

The object may comprise at least one of a user's face or eye.

The processing resource may be configured to: determine at least one property of the object and/or at least one operating parameter or property of the device; determine whether the object comprises a user, a user's face or eye, based on the determined at least one property or operating parameter; and to perform the proximity-dependent controlling of operation of the transmitter and/or of at least one other component of the optical wireless communication device in response to determining that the object comprise a user, a user's face or eye.

The optical wireless communication device may comprise at least one further sensor for detecting at least one property of the object The at least one proximity determining component may comprise at least one of an infra-red sensor, an ultra-violet sensor, an RF sensor, a camera-based sensor, an imaging device, an inductive and/or capacitive sensor, an acoustic sensor.

The at least one proximity determining component may be configured to generate at least one detection signal and the at least one proximity determining component and/or the processing resource may be configured to determine at least one property of the object based on the at least one detection signal.

The optical wireless communication device may comprise at least one of a mobile and/or hand-held computing device, a smartphone, a mobile phone, a tablet, a computer, a laptop, an access point.

The device may be configured to communicate using a further communication protocol in addition to optical wireless communication.

The further communication protocol may comprise at least one of: a radio-frequency communication protocol, wireless mobile telecommunication, Wi-Fi, global positioning system, short message service, multimedia message service, Ethernet connection.

The modulated light may comprise at least one of infra-red radiation, ultra-violet radiation, visible light.

In a further aspect, which may be provided independently, there is provided a method of controlling operation of an optical wireless communication device comprising: determining a proximity of an object to the device; determining whether the determined proximity is within a user safety threshold distance and controlling operation of a transmitter of the optical wireless communication device and/or of at least one other component of the optical wireless communication device in dependence on whether the determined proximity is within the user safety threshold distance.

Features in one aspect may be applied as features in another aspect. For example, method features may be applied as device features and vice versa.

BRIEF DESCRIPTION OF THE DRAWINGS

These and other aspects will now be further described, by way of example only, with reference to the accompanying figures in which.

DETAILED DESCRIPTION OF THE DRAWINGS

Figure 1A:
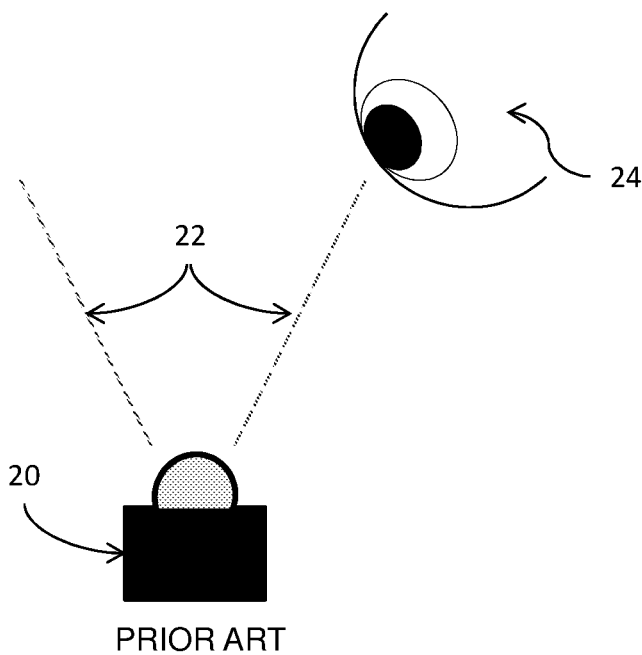
FIGS. 1(a) and 1(b) are schematic illustrations of known devices in operation.
Figure 1B:
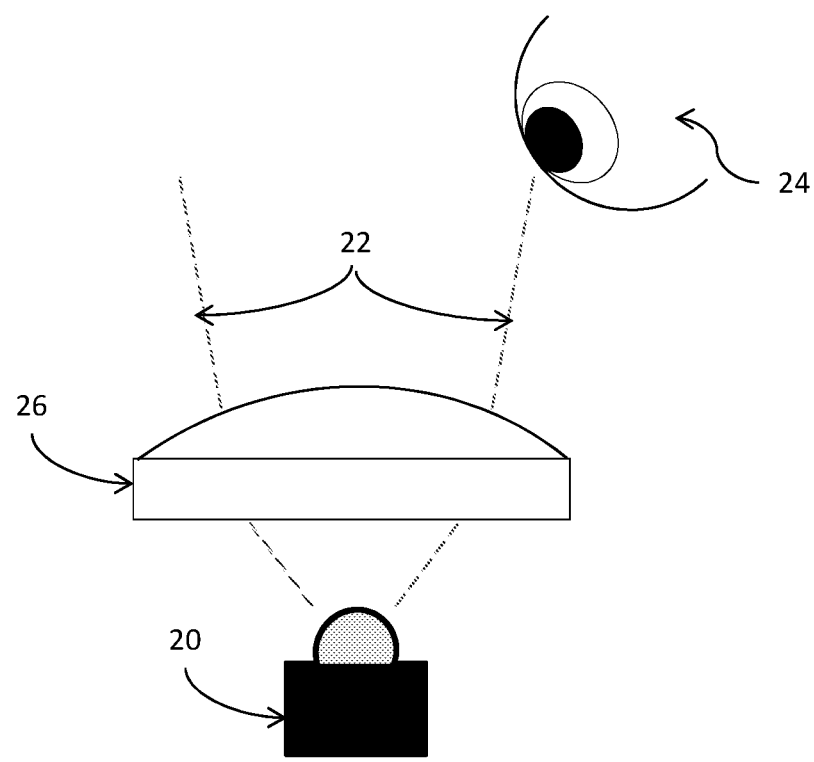
Figure 2:
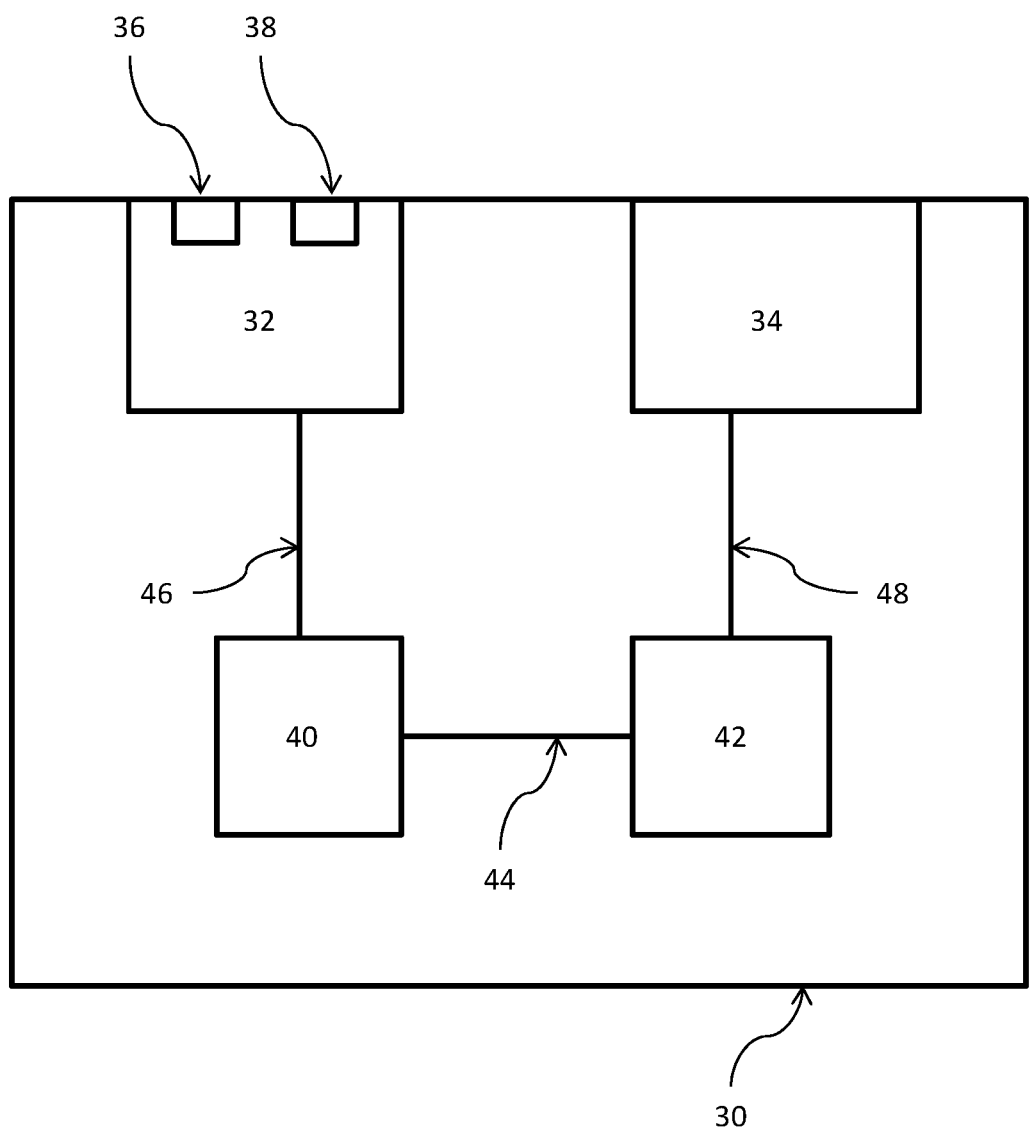
FIG. 2 is a schematic diagram of an optical wireless communication device according to an embodiment.

FIG. 2 is a schematic block diagram of an optical wireless communication device 30 according to a first embodiment. The device 30 includes a transceiver 32, which is configured to transmit and receive optical wireless communication signals, and a component 34 for use in determining proximity, a proximity sensor in this embodiment. The wireless optical communication device 30 also includes an optical wireless communication (OWC) processor 40 and a host processor 42. The device has a bus or interface 44 for carrying signals between the host processor 42 and the OWC processor 40. The device also has a transceiver bus 46 or interface for carrying signals between the OWC processor 40 and the transceiver 32. A third data bus 48 connects the proximity sensor 34 to the host processor 42.

In the embodiment of FIG. 2 the optical wireless communication device is a mobile phone, and the host processor 42 is configured to control normal operation of the mobile device including RF mobile communications and other functions and devices of the mobile phone in accordance with any known techniques.

While represented in a FIG. 2 as a single processor, the OWC processor 40 may be implemented in any suitable fashion, for example as a plurality of processors or sets of processing circuitry. There may, for example, be a processing resource for controlling the transmitter and a separate processing resource for controlling and/or receiving data from the receiver 38. In some embodiments, the host processor 42 and the OWC processor 40 may be implemented as a single processing resource or combination of processing resources. In some embodiments, some or all of the functionality of the OWC processor 40 may be provided by software installed on the host processor 42. For example, in mobile device or other embodiments some or all of the functionality described as being provided by the OWC processor 40 may be provided by software installed on a processor (such as the host processor 42) that controls operation of the mobile or other device.

In the embodiment of FIG. 2, the component 34 for use in determining proximity comprises a proximity sensor associated with a camera (not shown) included in the mobile phone 30 and used for range finding and/or focusing processes associated with the camera using any known techniques for example infrared time-of-flight or doppler techniques. It is a feature of the embodiment of FIG. 2 that the proximity information obtained by the proximity sensor 34 is also used in control of optical wireless communication using transceiver 32 as described in more detail below.

In alternative embodiments, any suitable proximity determining techniques may be used. For example, in an alternative embodiment the camera (not shown) included in the mobile phone 30 is used to obtain an image or images, and then image recognition or other techniques are used to determine the presence of one or more objects and their proximity. For example, image recognition techniques may be used to recognise that a face or eye or other object is present in an image and/or to determine the proximity to the device of the face or eye or other object, for example based on the size or scale of the face or eye or other object in the image.

In an alternative embodiment, image recognition techniques are used to recognise that a face or eye or other predetermined object is present and then further proximity detection techniques are used to determine the proximity of the face or eye or other object, for example infra-red or other range-finding techniques. Thus, for example a reduction in power or halting of transmission, or otherwise moving to or maintaining a close proximity operational mode, may occur in such embodiments, based on determined proximity of an object, only if the object is of a predetermined type, for example a human or animal face or eye. In some such embodiments if the object is of a different type, transmission may continue normally if the object is not of the predetermined type even if it has a proximity within the threshold distance.

The transceiver 32 comprises a transmitter 36 and a receiver 38, as well as associated driving circuitry, modulation circuitry and conditioning circuitry (not shown). Any suitable driving circuitry, modulation circuitry and conditioning circuitry may be used in accordance with known optical wireless communication techniques to operate the transmitter 36 and receiver 38, to modulate signals representing data on to the output of the transmitter 36 and to demodulate signals received at the receiver 38 to obtain data modulated on to the received signals. The various circuitry may include digital to analogue and/or analogue to digital circuitry, and/or filtering circuitry, suitable for the wavelengths that are transmitted and received, in accordance with known techniques.

In the embodiment of FIG. 2, the transmitter 36 includes a light emitting diode (LED), or other suitable light source, and the associated driving circuitry to drive the LED to produce the optical signal. The associated driving circuitry includes a digital to analogue converter configured to provide a modulation signal at a frequency characteristic of an optical light communication signal. The OWC processor 40 controls modulation of data onto a drive current using, for example, modulation circuitry, and the driving circuitry provides the drive current to the LED. The LED then produces outgoing modulated optical wireless communication signal(s) that carry the data.

The receiver 38 includes a photo-diode, or other suitable light detector, with associated circuitry to condition any received signal. The photo-diode converts received light to an electronic signal which is then conditioned by the conditioning circuitry. Conditioning may include one or more filter steps; amplification of a weak electrical signal; equalisation of received signals and converting the analogue signals into digital signals using an analogue to digital convertor. The digital signals can then be demodulated, for example using demodulation circuitry, to extract communication data.

Any suitable modulation scheme may be used, for example non on-off keying modulation schemes are used in some embodiments, and the demodulation is a demodulation from the non on-off keying modulation scheme. On-off keying is used in other embodiments. Other non-complex (i.e. not using real and imaginary representations) or complex (i.e. using real and imaginary representations) modulation schemes may be used in some other embodiments. Any suitable modulation frequency may be used, for example any suitable modulation frequency between 1 Hz and 10 THz, optionally between 1 kHz and 100 GHz, further optionally between 100 kHz and 10 GHz. The optical wireless communication device may in some embodiments comprises a LiFi communication device and may support a bi-directional communication protocol. The optical wireless communication device in various embodiments may support any suitable communication protocol for example IEEE 802.15.7, 802.15.13, 802.11 or extensions or developments thereof.

The receiver may be configured to receive light signals at a first wavelength and the transmitter may be configured to transmit at a second wavelength. For example, the outgoing light signal may be an infrared signal generated by an infrared diode and the incoming light may be a visible light signal.

Each transceiver may have its own optics implemented to guide light to and from the transceiver and/or to intensify light. The optics may be provided as a separate optical component or could be moulded with the transceiver. Separate optical components may be provided for the receiver and the transmitter if desired.

The OWC processor 40 is in communication with the transceiver 32. OWC processor 40 is configured to control operation of the transmitter 36 and receiver 38 of the transceiver 32, for example sending and or receiving control signals and/or data signals to and from the transceiver 32 to produce optical wireless communication signals and to obtain received data. The OWC processor is configured to provide, for example, the data that is to be represented by the optical wireless communication signals transmitted by the transmitter 36, and to control properties of the transmission process for example, the amplitude of the radiation transmitted by the transmitter 36 and the timing or other properties of the transmission process.

It is a feature of at least some embodiments that the OWC processor 40 controls operation of the transmitter 36 in dependence on a proximity of the device 30 to an object, for example a user's face or eye(s). For instance, in some embodiments the OWC processor 40 controls operation of the transmitter 36 in dependence on whether the device 30 is within a predetermined threshold distance.

Figure 3:
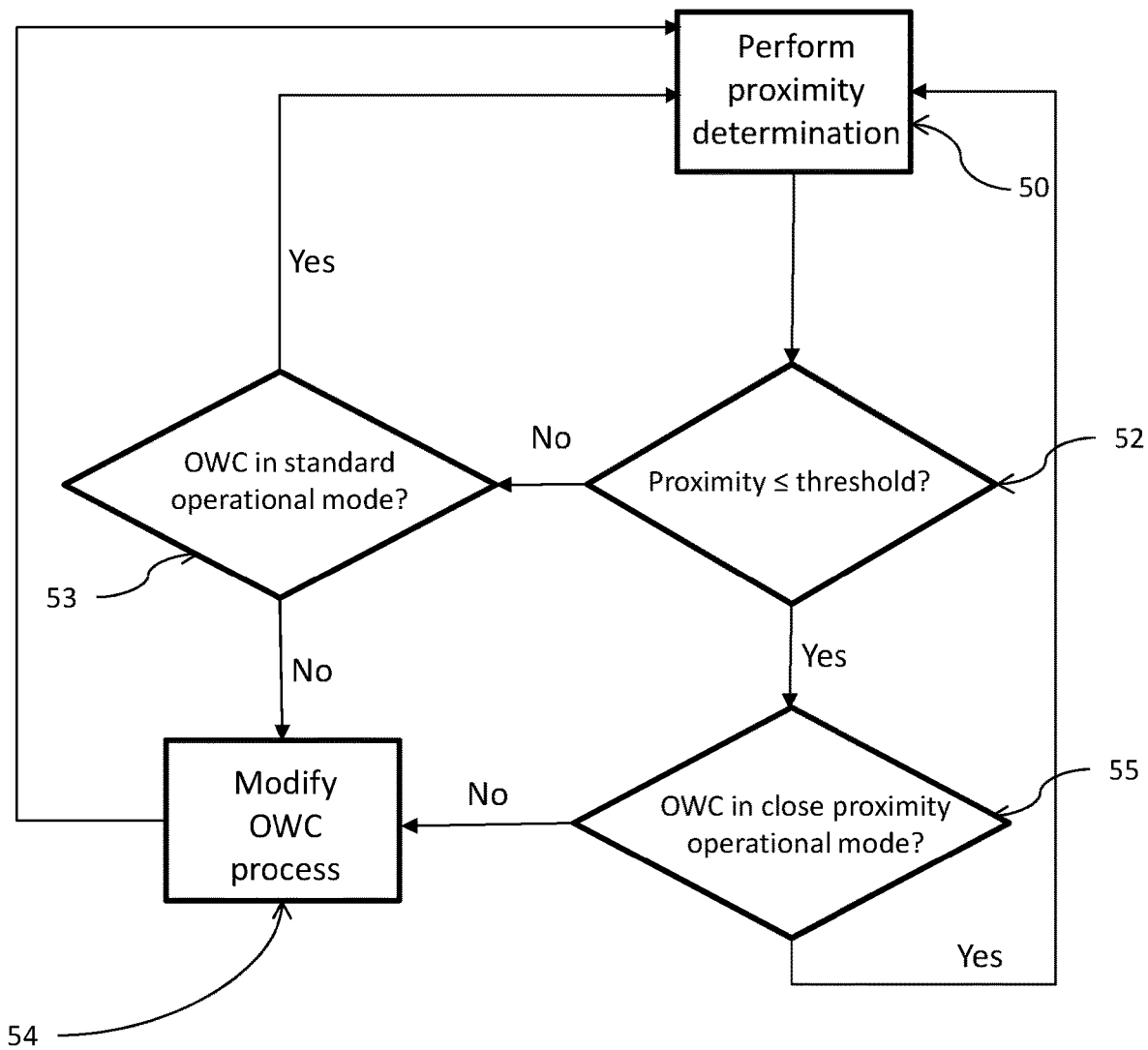
FIG. 3 is a flowchart illustrating in overview a process according to an embodiment.

An illustrative implementation of a process performed by the embodiment of FIG. 2 is for the host processor 42 is illustrated schematically in the flow chart of FIG. 3.

For the purposes of the present discussion, the process illustrated in FIG. 3 begins with the device 30 being at a position greater than the threshold distance from any object in a field of view of the proximity sensor.

At step 50 of FIG. 3, the proximity sensor 34 performs a proximity sensing process and sends one or more sensor signals to the host processor 42.

At step 52, the host processor 42 processes the sensor signal(s) to determine if the determined proximity has passed through a threshold such that there is an object within a threshold distance in the field of view of the proximity sensor.

If there is not an object within the threshold distance, then the process passes to step 53 and it is determined whether the optical wireless communication process is currently in the standard operational mode (for example is currently transmitting at normal power).

If it is determined that the optical wireless communication process is currently in the standard operational mode, the process returns to step 50 and operation of the device 30 continues as normal. For example, if there is an optical wireless transmission process going on controlled by the OWC processor 40, this optical wireless transition process continues unaffected if there is no object within the threshold distance in the field of view of the proximity sensor.

If at step 53 of the present example it had been determined that the optical wireless communication process was not currently in the standard operational mode (for example if the proximity had just changed from being within the threshold distance to outside the threshold distance, and the current operational mode was a close proximity operational mode) then the process would proceed from step 53 to step 54 and the operational mode would be switched, in this example, to the standard operational mode.

Stages 50 and 52 of the process are then repeated, with further proximity sensing processes being performed by the proximity sensor 34 and further sensor signal(s) being sent to the host processor 42, until it is determined at stage 52 that the determined proximity is now less than the threshold distance.

The process then passes to stage 54 and an optical wireless communication process controlled by OWC processor 40 is modified in response to the determined proximity having passed through the threshold and now being less than the threshold distance.

In the embodiment of FIG. 3 the modifying of the optical wireless communication process comprises passing from a standard operational mode to a close proximity operational mode (if the optical wireless communication process is currently in the standard operational mode, for example is currently transmitting at normal power) or passing from the close proximity operating mode to the standard operating mode (if the optical wireless communication process is currently in the close proximity operational mode).

In one embodiment, the modifying of the optical wireless communication process comprises halting in response to the determined proximity being less than threshold distance any optical wireless creation process being performed by the transceiver 32.

If no optical wireless communication transmission is currently occurring or scheduled to occur then the modifying of the optical wireless communication process may comprise altering a value of flag or other parameter, for example at the OWC processor 40, such that if an optical wireless communication transmission is subsequently instructed or is due to occur then such transmission is held and does not occur until the determined proximity is again greater than the threshold distance.

The process then returns to stage 50, and stages 50 and 52 are repeated until the determined proximity again passes through the threshold. In the case of the process that is the subject of the present discussion, that would mean the determined proximity of the object in the field of view of the proximity sensor increasing such that it is greater than the threshold distance. The process then passes to passes to stage 55 and it is determined whether the optical wireless communication process is currently in the close proximity operational mode (for example is not transmitting or is transmitting at less than normal power).

If it is determined at stage 55 that the optical wireless communication process is currently in the close proximity operational mode, the process returns to stage 50 and continues.

If instead it is determined at stage 55 that the optical wireless communication process is not currently in the close proximity operational mode, the process passes to stage 54 and the optical wireless communication process is again modified, by passing to the standard operational mode. In some embodiments, the modification comprises resuming a previously halted optical wireless transmission, or altering the value of a flag or the parameter such that if an optical wireless communication transmission is subsequently instructed or is due to occur then such transmission is allowed to proceed.

The process then continues again from stage 50.

Figure 4A:
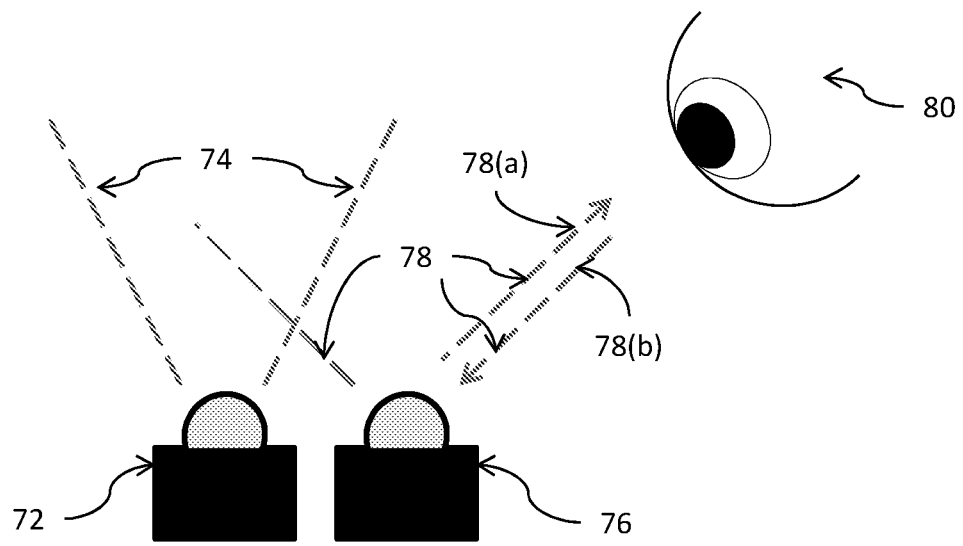
FIG. 4(a) is a schematic illustration of a wireless optical communication device in operation according to an embodiment.
Figure 4B:
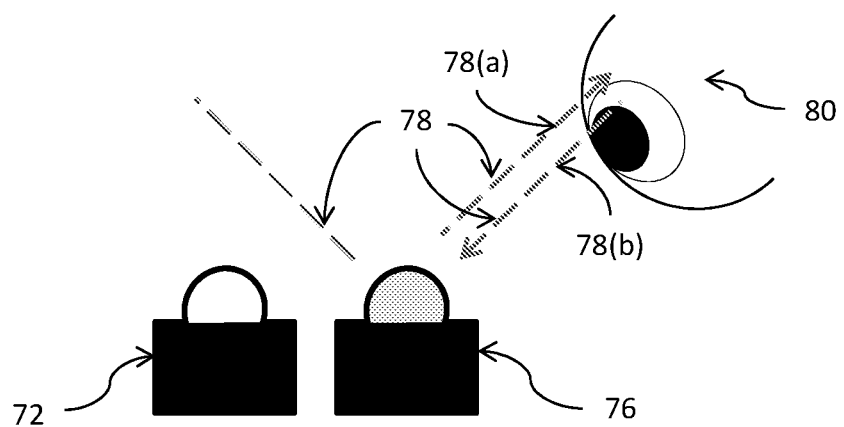
FIG. 4(b) is a further schematic illustration of the device of Figure (a) in operation.

A process according to a further embodiment, which is similar to that described in relation to FIG. 3, is illustrated schematically in FIGS. 4(*a*) and 4(*b*).

FIG. 4(*a*) shows a transmitter component 72 of a transceiver device emitting wireless optical communication signals 74. Adjacent to transmitter 72 is a proximity sensor 76 with IR proximity signals 78, wherein the proximity sensor emits outgoing proximity signals 78(*a*) and receives return signals 78(*b*). The proximity sensor 76 is used to detect if an object 80 (preferably human, represented in this case with an eye ball) comes within a predefined range of the proximity sensor. The proximity sensor 76 and the transmitter may be configured such that the field of view of the proximity sensor and the field of view of the transmitter are aligned and/or overlap and/or are substantially the same for at least a specified distance or range of distances from the device. In some embodiments, the proximity sensor is configured such that its field of view covers a part of the field of view of the transmitter where a maximum intensity of radiation may be expected.

When the object is sufficiently far to ensure eye-safety constraints are met, the device operates normally as intended. FIG. 4(*b*) shows the same embodiment as FIG. 4(*a*), however in this scenario the transmitter 72 is switched off or is controlled such that transmission is sufficiently reduced (e.g. to ensure that the radiation 74 does not pose a risk to the object 80), halted or not allowed since the object 80 is within the threshold distance of the proximity sensor adjacent to the transmitter.

In the embodiments of FIGS. 2, 3, 4(*a*) and 4(*b*) the halting of transmission, or not allowing of transmission, in response to a proximity of an object being determined to be within a threshold distance has been described. In alternative embodiments operation of the transmitter may be controlled in other ways in response to the determined proximity being within the threshold distance and/or when the transmitter is in a close proximity operational mode.

In some embodiments, the amplitude at relevant wavelength(s) of the light emitted by the transmitter is reduced in response to the determined proximity being within the threshold distance and/or when the transmitter is in a close proximity operational mode. In some such embodiments, the amplitude is reduced proportionately to the determined proximity, for proximities less than the threshold distance, or the amplitude follows some other predetermined relationship with respect to determined proximity.

In some embodiments, there may be provided at least one optical or other component, for example a shutter, mirror, lens or diffuser, configured to at least partially block or redirect the light from the transmitter in response to the determined proximity being less than the threshold distance and/or in response to the transmitter being in a close proximity operational mode.

In some embodiments, at least one further transmitter may be provided and the OWC processor 40 and/or host processor 42 is configured to switch operation of the transmitter to a close proximity operational mode (in which for example transmission may be halted or transmission power may be reduced) and to transmit light and/or data using the at least one further transmitter, in response to determined proximity of an object being within the threshold distance and/or in response to any other selected close proximity operational mode condition being satisfied.

In some embodiments, data is transmitted via both the transmitter and the at least one further transmitter and the transmitter (or the at least one further transmitter) are switched to the close proximity operational mode (for example halting transmission or reducing power) in response to a determined proximity of an object being within the threshold distance of the transmitter (or the at least one further transmitter) and/or any other suitable condition being satisfied.

In some embodiments, the power of the light transmissions are controlled such that the total irradiance from transmitter and the at least one further transmitter is maintained at a desired value or within a desired range, subject to there being at least one of the transmitters for which no object is determined to be within a respective threshold distance.

In some embodiments, a controller (for example, OWC processor 40 or host processor 42 of FIG. 2) is configured to control operation of at least one further component of the device as well as or instead of the transmitter.

For instance, in some such embodiments, a controller is configured to control said at least one further component such as to encourage a user to increase a distance between their eye or eyes and the device. The further component may be a further light source configured to emit visible light, and one such embodiment is illustrated schematically in FIG. 5.

Figure 5:
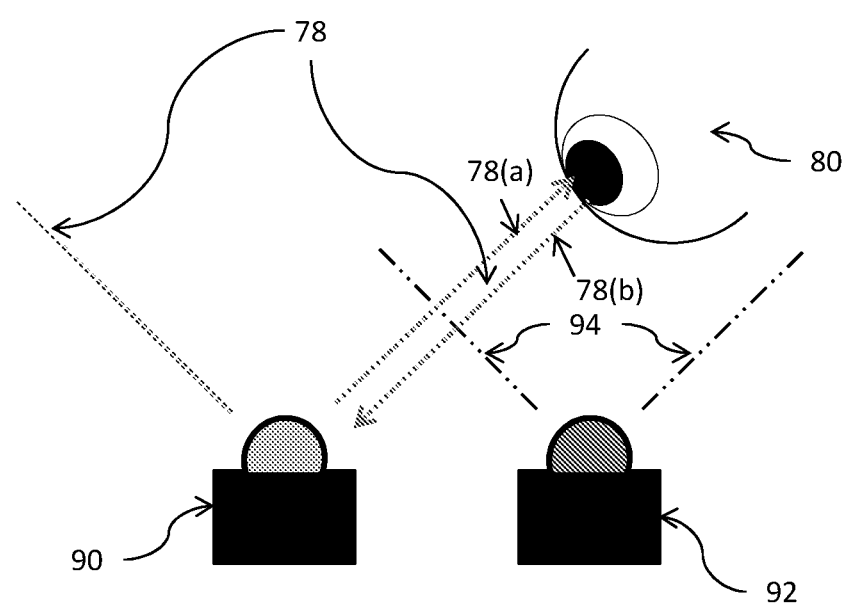
FIG. 5 shows an optical wireless communication device according to a further embodiment.

FIG. 5 shows an optical wireless communication device that comprises a proximity sensor device 90 comprising a transceiver that is configured to emit IR signals 78 that, in this case, are both modulated to provide a wireless optical communication signal and that are also used to determine proximity, emitting outgoing proximity signals 78(*a*) and receiving return signals 78(*b*). In variants of the embodiment, a separate optical wireless transceiver device and proximity sensor are provided in similar fashion to the embodiment of FIG. 2, rather than the same IR signals being used both for proximity sensing and optical wireless communication.

Similar to the embodiments described in FIG. 4(*a*) and FIG. 4(*b*), the proximity sensor device 90 is used to detect if an object 80 comes within a predefined threshold distance in the field of view of the proximity sensor and/or transmitter of the device 90 and the intensity of the emitted wireless optical communication signals 78 is sufficiently reduced, or the device 90 is turned off, in response to the object 80 being within the threshold distance.

In addition, the embodiment of FIG. 5 also includes a further light source 92 that is configured to emit visible light. In response to the object 80 being within the threshold distance of the device in the field of view of the proximity sensor and/or transmitter, the visible light source 92 emits a high intensity light 94. The light 94 emitted from the visible light source 92 is bright enough to ensure that a person, for example a person with normal eyesight, cannot bring their eyes to within the threshold distance of the device without their blink reflex being triggered by the intensity of the visible light source 92. The wavelength of the visible light source 92 may, for example, be any wavelength or combination of wavelengths in the visible range.

In a variant of the embodiment of FIG. 5, the operation of the transmitter that emits modulated IR light for optical wireless communications is not varied in response to determined proximity being within the threshold distance and continues operating as normal, and it is the visible light source 92 or other device, rather than the transmitter, that varies operation in response to the determined proximity being within the threshold distance.

In alternative embodiments, the controller may be configured to control the further light source and/or the light source of the transmitter to emit visible light having at least one property (for example, intensity, colour, or colour and/or intensity variation as a function of time) such as to provide discomfort and/or a warning signal for a user in response to the device being within the threshold distance of at least one of the user, the face of the user, an eye or eyes of the user.

In some embodiments, the visible light of the further light source may be flashing or pulsed light and the at least one property that is varied in response to the proximity being within the threshold distance may comprise a pulse or flash repetition frequency.

In some embodiments the device includes an alarm, and the alarm is configured to output an alarm signal, for example a suitable audible, visible, or tactile alarm signal, in response to the determined proximity being within the threshold distance.

As already mentioned a proximity sensor associated with a camera may be used to determine the proximity and may provide proximity information both to the camera (for example, for range-finding and/or focusing purposes) and for use in determining whether the determined proximity is within the user safety threshold distance Any suitable threshold distance may be set or used. For example, the threshold distance may be greater than or equal to a minimum distance at which the safety of the user may be expected to be preserved in the presence of the light (e.g. infrared light or any other suitable wavelength of light) being output by the transmitter. For instance the threshold distance may be greater than or equal to a distance at which damage to a user's eye might be expected to occur due to the modulated IR or other radiation.

The threshold distance may be determined based on the light power per solid angle of light emitted by the transmitter in operation, for example to ensure that such light power per solid angle is at or below a predetermined threshold value at the threshold distance in operation.

In some embodiments, the threshold distance may be in a range 1 cm to 20 cm, optionally in a range 1 cm to 36 cm, optionally in a range 1 cm to 5 cm, optionally less than 20 cm, optionally less than 36 cm, optionally less than 5 cm.

A processing resource for controlling the optical wireless communication process and/or the proximity sensing, for example the host processor 42 or OWC processor 40, is, in some embodiments, configured to determine a respective length of time for which the object is at any particular distance(s) or range of distances. The length of time that an object is at a particular distance from the transmitter, whilst the transmitter is operational, may be referred to as an exposure time at that distance. The processing resource may be configured to control operation of the transmitter and/or of at least one other component of the optical wireless communication device in dependence on a value of a function. The processing resource may calculate the value of the function. The function in some embodiments may comprise a function of exposure time and distance between the objection and the transmitter and/or power per solid angle of the transmitter. The function may represent total light energy received by the object from the transmitter.

Thus, for example, the processing resource may not trigger a reduction in power or halting of the light transmission, or otherwise move to a close proximity operational mode, immediately that the determined proximity of an object is within a threshold distance. Instead a function of the determined proximity and the duration of exposure may be calculated repeatedly, and the processing resource may cause a reduction in power or halting of the light transmission in response to the value of the calculated function exceeding a threshold value.

Thus for example if the object was in contact with or in close proximity to the transmitter then calculation of the function may lead to a reduction in power or halting of the light transmission after a first time period, for example almost immediately, whereas if the determined proximity of the object was at or only just inside the threshold distance, then calculation of the function may lead to a reduction in power or halting of the light transmission only after a second, longer time period. Any suitable function may be used.

For example, in some embodiments the function may comprise or be proportional to a product of the duration and the inverse of the determined proximity, or a product of the duration and a power of the inverse of the determined proximity (for example, the inverse of the square of the determined proximity). In some embodiments the function may comprise or be proportional to a product of the duration and the difference between the threshold distance and the determined proximity, for proximities less than the threshold distance, or a power of said difference such as the value of said difference squared.

A processing resource for controlling the optical wireless communication process and/or the proximity sensing, for example the host processor 42 or OWC processor 40, is, in some embodiments, configured to determine one or more properties of an object sensed by the proximity sensor and use that information, optionally in combination with one more operating parameters or properties of the device, to determine how or whether to perform the proximity-dependent controlling of operation of the transmitter and/or of at least one other component of the optical wireless communication device.

For example, as mentioned above in connection with the use of a camera, some embodiments may use image recognition processes to determine whether a sensed object is a user, or comprises a user's face or eye, and may perform at least some of the proximity-dependent processes only if for example the object comprises a user's face or eye.

The processing resource may use other components of the mobile or other device to assist in determining the nature of a sensed object. For example, the processing resource may determine that the device may be being held in a user's hand or may be being used by a user, for example based on the output of one or sensors such as at least one pressure sensor and/or at least accelerometer, and/or based on keypress or touch screen activity. If it is determined that the device may be being held in a user's hand or may be being used by a user then the processing resource may conclude or may assign a higher probability that a detected object in the field of view of the proximity sensor and/or transmitter may comprise a human face or eye.

Although the use of a proximity sensor based on reflection of IR radiation has been discussed, any suitable type of proximity sensor may be used. For example in embodiments, the proximity sensor comprises at least one of an infra-red sensor, an ultra-violet sensor, an RF sensor, a camera-based sensor, an imaging device, an inductive and/or capacitive sensor, an acoustic sensor.

Although embodiments have been described that are implemented in the form of a mobile phone, other embodiments may be implemented in the form of any suitable device. For example, the optical wireless communication device comprises at least one of a mobile and/or hand-held computing device, a smartphone, a mobile phone, a tablet, a computer, a laptop, an access point according to certain embodiments. In some embodiments, the device may be configured to communicate using a further communication protocol in addition to optical wireless communication. For example, the device may be configured to use GSM or other mobile communications protocol, or any other suitable long- or short-range RF communications protocol as well as optical wireless communications. The further communication protocol in some embodiments comprises at least one of: a radio-frequency communication protocol, wireless mobile telecommunication, Wi-Fi, global positioning system, short message service, multimedia message service, Ethernet connection.

Embodiments have been described in which modulation of infra-red light is used to provide optical wireless communication. However, modulation of light of any suitable wavelength or range of wavelengths, as well as or instead of infra-red light, may be used to provide optical wireless communication according to various embodiments.

The modulated light may comprise electromagnetic waves with wavelength in a range 1 nm to 2500 nm, for example at least one of infra-red radiation, ultra-violet radiation or visible light, according to certain embodiments.

Devices according to embodiments may be particularly suitable for meeting eye safety constraints in systems that require high light intensity on the transmitter side in combination with a small transmitter optical aperture.

A skilled person will appreciate that variations of the described embodiments are possible without departing from the invention. Accordingly, the above description of the specific embodiments is made by way of example only and not for the purposes of limitation.

The invention claimed is:

1. An optical wireless communication device for transmitting data comprising:
   a transmitter comprising a light source;
   a controller configured to control operation of the light source to produce modulated light comprising an optical wireless communication signal representative of the data;
   at least one proximity determining component configured to determine a proximity of an object; and
   a processing resource configured to determine whether the determined proximity is within a threshold distance, wherein the controller is configured to control operation of the transmitter in dependence on whether the determined proximity is within the threshold distance, wherein the controlling of operation of the transmitter comprises at least one of:
   reducing an intensity of the light;
   at least one of halting generation by the light source of the light, at least partially blocking the light, or at least partially redirecting the light; or
   if no optical wireless communication transmission is currently occurring or scheduled to occur altering a value of a flag or other parameter to prevent transmission of light until the determined proximity is greater than the threshold distance.

2. The device according to claim 1, wherein the controlling of operation of the transmitter comprises at least one of moving from a first operational mode to a second operational mode, or maintaining the second operational mode, in response to the determined proximity being within the threshold distance.

3. The device according to claim 1, wherein the processing resource and controller are provided as separate components.

4. The device according to claim 1, wherein the processing resource and controller each form part of a single component.

5. The device according to claim 1, further comprising a further transmitter, wherein
   the controller is configured to transmit the data by producing modulated light comprising the optical wireless communication signal representative of the data using one or both of the transmitter and the further transmitter, and
   the controller is configured to selectively control operation of the further transmitter in dependence on whether the determined proximity of the object is within the threshold distance.

6. The device according to claim 5, wherein:
   at least part of the optical wireless communication is transmitted simultaneously by the transmitter and by the further transmitter; or
   at least part of the optical wireless communication is transmitted successively by the transmitter and by the further transmitter.

7. The device according to claim 5, wherein the proximity determining component is configured to determine a proximity of an object from the transmitter and to determine a further proximity of an object from the further transmitter, and the controller is configured to control operation of the transmitter and the further transmitter in dependence on whether the determined proximity is within the threshold distance and in dependence on whether the further proximity is within the threshold distance.

8. The device according to claim 5, wherein at least one of:
   the further transmitter comprises a further light source;
   the device further comprises at least one of a guide or switch arrangement configured to guide light from the light source to at least one of the transmitter or the further transmitter; or
   the controller is configured to selectively control operation of the transmitter and the further transmitter such that the total power or irradiance from the transmitter and the further transmitter is maintained at a desired value or within a desired range, subject to there being at least one of the transmitters for which determined object proximity is not within the threshold distance.

9. The device according to claim 1, wherein the controller is further configured to control operation of another component of the optical wireless communication device, and the controlling of operation of the other component of the optical wireless communication device comprises controlling the other component such as to encourage a user to increase a distance between the user's eye or the user's eyes and the wireless communication device.

10. The device according to claim 9, wherein the other component comprises a further light source, and the further light source is configured to emit visible light.

11. The device according to claim 10, wherein the processing resource is configured to control at least one of a further light source or the light source of the transmitter to emit visible light having a property such as to provide at least one of discomfort or a warning signal for a user in response to the device being within the threshold distance of at least one of the user, the face of the user, an eye of the user or eyes of the user.

12. The device according to claim 11, wherein at least one of:
the property of the visible light comprises intensity, colour, or at least one of colour or intensity variation as a function of time;
the visible light is flashing or pulsed light and the property comprises a pulse or flash repetition frequency.

13. The device according to claim 9, wherein at least one of:
the other component comprises an alarm; or
the device is configured to output an alarm signal in response to the determined proximity being within the threshold distance.

14. The device according to claim 1, wherein the proximity determining component comprises a camera and the processing resource is configured to perform an image recognition procedure on image data obtained from the camera in order to determine at least one of the proximity of the object or property of the object.

15. The device according to claim 14, wherein the image recognition procedure comprises determining whether the object comprises a user, a user's face or a user's eye based on the image data obtained from the camera.

16. The device according to claim 15, wherein the image recognition procedure further comprises determining the proximity to the device of the user, the user's face or the user's eye based on the size or scale of the user, the user's face or the user's eye in the image data obtained from the camera.

17. The device according to claim 1, further comprising a camera, wherein at least one of the proximity determining component or the processing resource is configured to provide proximity information from the proximity determining component both to the camera and for use by the processing resource in determining whether the determined proximity is within the user safety threshold distance.

18. The device according to claim 1, further comprising a sensor for receiving light reflected by the object and configured to provide a sensor signal representative of the received light, and the proximity determining component is configured to determine the proximity based on the sensor signal, wherein optionally the transmitter is arranged such that light reflected by the object comprises light from the transmitter.

19. The device according to claim 1, wherein at least one of:
the threshold distance comprises a user safety threshold distance;
the threshold distance is a distance at which a power per solid angle of light emitted by the transmitter is at or below a predetermined threshold value; or
the threshold distance is in a range of 1 cm to 36 cms.

20. The device according to claim 1, wherein the controlling of the operation of the transmitter or wherein controlling of operation of another component of the optical wireless communication device is in dependence on both the determined proximity being within the threshold distance and at least one further selected condition being satisfied.

21. The device according to claim 20, wherein at least one of
the selected condition comprises a length of time at which the object is at a particular distance or distances; or
the selected condition comprises a value of a function representing total light energy received by the object from the transmitter.

22. The device according to claim 1, wherein the object comprises at least one of a user's face or the user's eye.

23. The device according to claim 1, wherein the processing resource is configured to:
determine a property of at least one of the object, operating parameter of the device or property of the device;
determine whether the object comprises a user, the user's face or the user's eye, based on the determined at least one operating parameter or property; and
perform the proximity-dependent controlling of operation of at least one of the transmitter or another component of the optical wireless communication device in response to determining that the object comprises the user, the user's face or the user's eye.

24. The device according to claim 1, wherein the optical wireless communication device comprises a further sensor for detecting a property of the object.

25. The device according to claim 1, wherein at least one of:
the proximity determining component comprises at least one of an infra-red sensor, an ultra-violet sensor, an RF sensor, a camera-based sensor, an imaging device, an inductive and/or capacitive sensor, an acoustic sensor;
the proximity determining component is configured to generate a detection signal and the processing resource is configured to determine a property of the object based on the detection signal;
the optical wireless communication device comprises at least one of a mobile or hand-held computing device, a smartphone, a mobile phone, a tablet, a computer, a laptop, or an access point;
the device is configured to communicate using a further communication protocol in addition to optical wireless communication; or
the modulated light comprises at least one of infra-red radiation, ultra-violet radiation, or visible light.

26. A method of controlling operation of an optical wireless communication device comprising:
determining, by a proximity determining component, a proximity of an object to the optical wireless communication device;
determining, by a processing resource, whether the determined proximity is within a user safety threshold distance; and
controlling, by a controller, operation of a transmitter of at least one of the optical wireless communication device or another component of the optical wireless communication device in dependence on whether the determined proximity is within the user safety threshold distance,
wherein the transmitter comprises a light source;
wherein the controller is configured to control operation of the light source to produce modulated light comprising an optical wireless communication signal representative of the data;

wherein the controlling of the operation of the transmitter comprises at least one of:
reducing an intensity of the light;
at least one of halting generation by the light source of the light, at least partially blocking the light, or at least partially redirecting the light; or
if no optical wireless communication transmission is currently occurring or scheduled to occur altering a value of a flag or other parameter to prevent transmission of light until the determined proximity is greater than the threshold distance.

\* \* \* \* \*